US012254639B2

United States Patent
Serra Lleti et al.

(10) Patent No.: US 12,254,639 B2
(45) Date of Patent: Mar. 18, 2025

(54) METHOD FOR DETERMINING BOUNDARIES OF A Z-STACK OF IMAGES OF AN OBJECT, CORRESPONDING OPTICAL INSTRUMENT AND COMPUTER PROGRAM THEREFOR

(71) Applicant: Leica Microsystems CMS GmbH, Wetzlar (DE)

(72) Inventors: Jose Miguel Serra Lleti, Wetzlar (DE); Tobias Hessler, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 314 days.

(21) Appl. No.: 18/063,691

(22) Filed: Dec. 9, 2022

(65) Prior Publication Data
US 2023/0186483 A1    Jun. 15, 2023

(30) Foreign Application Priority Data
Dec. 14, 2021   (EP) .................................... 21214515

(51) Int. Cl.
  *G06T 7/13*     (2017.01)
  *G02B 21/24*    (2006.01)
(52) U.S. Cl.
  CPC .............. *G06T 7/13* (2017.01); *G02B 21/244* (2013.01); *G06T 2207/10056* (2013.01)
(58) Field of Classification Search
  CPC ........ G02B 21/244; G06T 2207/10056; G06T 2207/10152; G06T 7/12; G06T 7/13; G06T 7/174
(Continued)

(56) References Cited

U.S. PATENT DOCUMENTS 9,297,995 B2 *   3/2016  Kramer ................ G06V 20/693
11,971,529 B2 *  4/2024  Sieckmann ............ G06V 10/82
(Continued)

FOREIGN PATENT DOCUMENTS

EP    3 454 296 A1      3/2019
WO    WO 2021/108321 A1 6/2021

OTHER PUBLICATIONS

Said Pertuz et al., "Analysis of focus measure operators for shape-from-focus", in Pattern Recognition 46, May 2013, pp. 1415-1432, Elsevier, Netherlands.
(Continued)

*Primary Examiner* — Christopher S Kelley
*Assistant Examiner* — Ana Picon-Feliciano
(74) *Attorney, Agent, or Firm* — LEYDIG, VOIT & MAYER, LTD.

(57) ABSTRACT

A method of automatically determining boundaries of a z-stack of images of an object, the z-stack of the images acquired by imaging the object at different focal positions, is provided. The method includes generating a set of images of the object, each image being captured at a different focal position, and applying a blurriness-W metric function to each image. The blurriness-W metric function is a blurriness or sharpness metric function having a focal position as a variable, and shows a global extremum for maximal or minimal sharpness at the focal position and secondary extrema adjoining the global extremum. The method includes calculating, by the blurriness-W metric function, a metric value for each image, and based on the blurriness-W metric function showing a primary extremum and two of the secondary extrema adjoining the primary extremum, determining the z-stack boundaries in dependence of the focal positions assigned to the two secondary extrema.

18 Claims, 8 Drawing Sheets

(58) Field of Classification Search
USPC .......................................................... 348/79
See application file for complete search history.

(56) References Cited

U.S. PATENT DOCUMENTS

| | | | |
|---|---|---|---|
| 2002/0071125 A1* | 6/2002 | Sieckmann | G01B 11/24 |
| | | | 356/609 |
| 2012/0236120 A1 | 9/2012 | Kramer et al. | |
| 2013/0135456 A1* | 5/2013 | Kishima | H04N 7/18 |
| | | | 348/79 |
| 2014/0015984 A1* | 1/2014 | Seow | H04N 17/002 |
| | | | 348/187 |
| 2014/0232844 A1* | 8/2014 | Wolff | G02B 21/244 |
| | | | 348/79 |
| 2015/0110391 A1* | 4/2015 | Zhou | G06T 7/174 |
| | | | 382/164 |

OTHER PUBLICATIONS

Kornilova et al.: "Smart mobile microscopy: towards fully-automated digitization", arxiv.org, Cornell University Library, 201 Olin Library Cornell University Ithaca, NY 14853, US, May 24, 2021 (May 24, 2021), XP081968125, pp. 1-18.

* cited by examiner

METHOD FOR DETERMINING BOUNDARIES OF A Z-STACK OF IMAGES OF AN OBJECT, CORRESPONDING OPTICAL INSTRUMENT AND COMPUTER PROGRAM THEREFOR

CROSS REFERENCE TO PRIOR APPLICATION

This application claims benefit to European Patent Application No. EP 21214515.5, filed on Dec. 14, 2021, which is hereby incorporated by reference herein.

FIELD

The present invention relates to a method of automatically determining boundaries of a z-stack of images of an object, which z-stack of images is to be acquired by imaging the object at different focal positions by an optical instrument. The present invention further relates to a corresponding optical instrument and to a computer program for performing said method.

BACKGROUND

In microscopic imaging, a z-stack is a set of several images captured consecutively in the same x-y-position of the sample/object, but at different focal depths/z-positions. In the present application, the focal direction or the direction of the z-axis is perpendicular to the x-y-plane or "sample plane" of the sample or object. The images captured within a z-stack are typically image processed in order to generate a three-dimensional representation of the sample/object within the boundaries of the z-stack.

Microscope users typically spend a considerable amount of time looking at the sample before defining the limits or boundaries of a z-stack. One may first manually or automatically determine the z-position of a central plane e.g. at a focal position of optimal focus, e.g. at the center of the sample, and then expand the borders of the z-stack symmetrically starting from the central plane by defining a range of the z-stack and a number of images/slices within the z-stack. Such methods, however, often are not adapted to the sample itself, especially concerning the borders of the z-stack, and/or, especially when performed manually, very time consuming. Further, such methods can prove problematic for automatic acquisition processes, like large screenings. If the limits of acquisition are determined manually, the user needs, beforehand, observe the sample to learn the approximate extent of the object depth. If the sample has different regions with high variations of the focal plane, setting limits of corresponding z-stacks is a time-consuming effort. On the other hand, setting fixed z-stack limits may lead, in such a case, depending on the sample region, to empty images or to a z-stack not including the boundaries of the sample leading to missing image information.

SUMMARY

In an embodiment, the present disclosure provides a method of automatically determining boundaries of a z-stack of images of an object, which z-stack of the images is to be acquired by imaging the object at a plurality of different focal positions by an optical instrument. The optical instrument includes instrument optics and a focus adjusting unit for imaging the object at the plurality of different focal positions through the instrument optics. The method includes the steps of generating a set of images of the object, each image being captured at a different respective focal position, applying a blurriness-W metric function to each image of the set of images. The blurriness-W metric function is a blurriness or sharpness metric function that has a focal position as a variable and shows a global extremum for maximal or minimal sharpness at the focal position, and additionally shows secondary extrema adjoining the global extremum. The method also includes calculating, by the blurriness-W metric function, a metric value for each image, different metric values being associated to a different image sharpness or blurriness of the corresponding images, and based on the blurriness-W metric function with the focal position as a variable showing a primary extremum and two of the secondary extrema adjoining the primary extremum, determining the z-stack boundaries in dependence of the focal positions assigned to the two secondary extrema.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
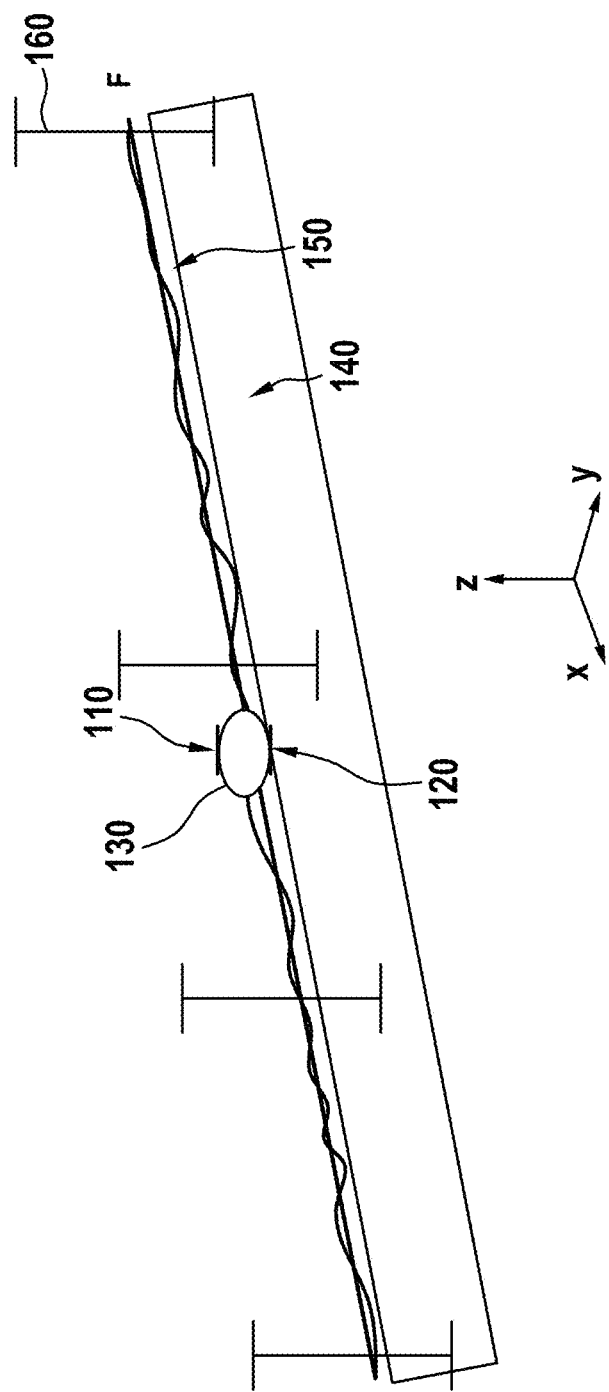
FIG. 1 schematically shows an example of a sample carrier carrying a sample for acquisition of a z-stack of images by a microscope.

Embodiments of the present invention provide an improved method for automatically determining boundaries/borders/limits of a z-stack of images of an object/sample, especially in microscopy, which z-stack of images is to be acquired by imaging the object at different focal positions by an optical instrument such as a microscope. Embodiments of the present invention also provide an improved corresponding optical instrument as well as a computer program with program code for performing said method.

In particular embodiments, the present invention is in the field of microscopy where a z-stack of images of an object is acquired particularly for three-dimensional imaging of the object by means of image processing of the z-stack images.

In order to automatically determine suitable boundaries of a z-stack at an x-y-position of the sample/object, a set of images of the object is generated, each image being captured at a different focal position. To this end, the optical instrument comprises instrument optics and a focus adjusting unit for imaging the object at different focal positions through the instrument optics. In other words, a z-stack or set of images of the object is acquired for automatically determining boundaries of another z-stack of images, which is to be acquired by imaging the object at different focal positions within the determined z-stack boundaries. Images acquired for determining the z-stack boundaries may or may not be used as images of the z-stack itself at a later point.

The principle of z-stack acquisition is often used in microscopy for autofocusing. At a given x-y-position of the sample, images are acquired while the microscope stage or the objective lens of the microscope is scanned in the focal direction to different z-positions. For the resulting z-stack, a certain metric function applied to each of the images can be used with the focal position as a variable. Such metric functions allow to extract information about image contrast, entropy, spatial frequency content etc. of the images of the z-stack. Various metric functions have been evaluated, especially with a view to different microscopic imaging modes and robustness to noise (see for example "Analysis of focus measure operators for shape-from-focus", Said Pertuz et al., in Pattern Recognition 46 (2013) 1415-1432).

The inventors found that some metric functions used for autofocusing can be used for automatically determining boundaries of a z-stack. The inventors found that among the metric functions used for autofocusing, two types of metric functions can be identified, namely "blurriness metric functions" and "blurriness-W metric functions".

By using a so-called "blurriness metric function", its global minimum gives the focal position of minimal blurriness within the z-stack, i.e. of maximal sharpness, and thus typically the position of the focal plane of the object to be imaged. Best results are achieved for a reference object, which may be defined as a spheroidal or ellipsoidal object of defined boundaries, such like a cell or a cell-cluster. A "sharpness metric function" would correspond to a "blurriness metric function" of opposite sign and should thus be covered by the term "blurriness metric function". When the object is in focus, the captured image should demonstrate a large image contrast, a large range of intensity values, and sharp edges. Accordingly, a suitable blurriness (or sharpness) metric function should be particularly sensitive to focus, monotonically decreasing at both sides next to the focus, and, optimally, symmetric about the peak and not showing local extrema. Groups of metric functions, which may be used as blurriness metric functions, are given below.

"Blurriness-W metric functions" can be regarded as a subfamily of blurriness or sharpness metric functions, which show a global extremum, for example a global maximum for maximal sharpness at a focal position, and do additionally show local extrema, for example two local minima adjoining the global maximum (a metric function of this example would have the form of a "W"; this is why the name of a blurriness-W metric function is chosen. On the other hand, if such a metric function of opposite sign is considered, one might call it, due to the resulting "M" form, a "blurriness-M metric function", which should thus be covered by the term "blurriness-W metric function"). Again, best results are achieved for a reference object, which may be defined as a spheroidal or ellipsoidal object of defined boundaries, such like a cell or a cell-cluster. Using such "blurriness-W metric functions", the inventors found that the focal positions assigned to the two local extrema/minima represent or are indicative of boundaries of the object at which the corresponding images are sufficiently sharp so that they can still be differentiated from its background. In other words, the corresponding focal positions can be used for determining suitable boundaries of a z-stack. Z-stack boundaries may be determined in dependence of or mostly even as being the focal positions assigned to the two local extrema. In this description, a "primary extremum" is another term for a global maximum or global minimum, while the term "secondary extremum" designates a local maximum or local minimum.

To summarize, according to embodiments of the present invention, a blurriness-W metric function as defined above is applied to each of the images of the set of images acquired at different focal positions by the optical instrument, the blurriness-W metric function calculating a metric value for each of the images, different metric values being associated to a different image sharpness or blurriness of the corresponding images, and, if the blurriness-W metric function with the focal position as a variable shows a primary extremum and two secondary extrema adjoining the primary extremum, the z-stack boundaries are determined in dependence of the focal positions assigned to the two secondary extrema. If the primary extremum is a maximum, the two secondary extrema are typically minima, and vice versa.

Embodiments of the present invention make a purely automatic determination of z-stack boundaries possible without a need of a user observing the sample/object beforehand, making a guess as to the extent of the sample/object or defining a z-stack symmetrically starting from a center of the sample. By using a computer program with program code for performing embodiments of the method according to the present invention, the user can simply select z-stack imaging at a given position of the sample, and embodiments of the method according to the present invention can automatically determine limits or boundaries of the z-stack without any further user input. Thus, user friendliness of operating the optical instrument, particularly the microscope, is highly increased. When performing z-stack imaging, the user will only have to define a z-step interval and/or the number of images/slices within the predetermined z-stack. On the other hand, it may also be expedient to set such a step interval or number of images/slices by default based on the experience with specific samples and/or imaging modes.

It should be noted that, in practice, there is not only one single blurriness-W metric function suited to be applied to the set of images according to embodiments of the method of the present invention. Thus, two or more blurriness-W metric functions may be selected out of the group of blurriness metric functions as defined above. It might then be expedient to apply two or more such blurriness-W metric functions to the set of images and select the focal positions where at least a number, e.g. at least two, blurriness-W metric functions have matching secondary extrema.

Further, it may be expedient to limit the range, within which the set of images is acquired, to a region around the focal plane. The focal plane may be found by applying a blurriness metric function, as explained above, to a set of images, which might be acquired with a bigger step size in the focal direction. The blurriness metric function applied could have an absolute extremum at the focal plane and optimally no further local extrema adjoining this absolute extremum. Applying such a blurriness metric function, the focal plane can easily be identified. Alternatively, a user may identify the focal plane visually. The step of generating a set of images of the object, each image being captured at a different focal position, according to embodiments of the present invention, should cover a range of focal positions including the focal plane. It should be noted that the primary extremum of the blurriness-W metric function typically is at the same focal position as the absolute extremum of the blurriness metric function.

Cases may occur, e.g. depending on the object and/or the imaging method, where the chosen blurriness-W metric function does not show or not clearly show two secondary extrema. In this case, as already explained above, another blurriness-W metric function from a set of suited blurriness-W metric functions may be selected.

Alternatively or for a redundancy check, a blurriness metric function as defined above is applied to each of the images of the set of images, the blurriness metric function calculating a metric value for each of the images, different metric values being associated to a different image sharpness or blurriness of the corresponding images, and if the blurriness metric function with the focal position as a variable shows an absolute extremum, an integration of the blurriness metric function is applied starting from the focal position of the absolute extremum and integrating equally at both sides thereof until a predefined part of the total integral over all of the focal positions is reached. The z-stack boundaries are then determined in dependence of the focal positions assigned to the two limits of the predefined part of the total integral.

This alternative method, in an embodiment, may either be applied to confirm the results of the first mentioned method of using a blurriness-W metric function or if the blurriness-W metric function, contrary to expectations, does—in the respective experimental setup—not or not sufficiently clearly show two secondary extrema. It should be noted, however, that the integration method based on a blurriness metric function might be used without first applying a blurriness-W metric function.

In this embodiment, the blurriness metric function having an absolute extremum typically at the optimal focal position or focal plane of the sample/object is integrated starting from the focal position of this absolute extremum and integrating equally at both sides thereof until a predefined percentage of the total integral is reached, the total integral over all focal positions of the set of images having been calculated beforehand, in parallel or subsequently. It is an advantage, but not a prerequisite, if the blurriness metric function is symmetrical in respect of the focal position of this absolute extremum. In the symmetric case, the distances of the two limits of the predefined part of the total integral to the focal position of the absolute extremum are (essentially) the same. Especially in this case, the z-stack boundaries may be determined as the focal positions assigned to the two limits of the predefined part of the total integral. Generally, and especially in the case of non-symmetric blurriness metric functions, the z-stack boundaries are determined in dependence of the found focal positions assigned to the two integral limits. Examples will be described in further detail below.

In an embodiment, if the blurriness-W metric function shows a primary extremum and two secondary extrema adjoining the primary extremum, it still may make sense to additionally apply a blurriness metric function for verifying whether the primary extremum of the blurriness-W metric function corresponds to the absolute extremum of the blurriness metric function. This verification serves the purpose that both metric functions are applied to a set of images acquired in the vicinity of the focal plane or optimal focal value and not to a set of images acquired in the vicinity of a focal position of a secondary extremum.

In a similar embodiment where the blurriness-W metric function is applied, before the step of applying the blurriness-W metric function to each of the images of the set of images, a blurriness metric function may (additionally) be applied to each of the images of the set of images, the blurriness metric function as defined above calculating a metric value for each of the images, different metric values being associated to a different image sharpness or blurriness of the corresponding images, and if the blurriness metric function with the focal position as a variable shows an absolute extremum and is symmetrical in respect of the corresponding focal position of this absolute extremum and, particularly, does not show two secondary extrema adjoining the absolute extremum or more generally does not show any secondary extrema, then the blurriness-W metric function is applied to each of the images of the set of images in order to determine the z-stack boundaries. This embodiment of first applying a blurriness metric function in the above way and then applying a blurriness-W metric function for determining the z-stack boundaries has proven beneficial and yields good results in determining z-stack boundaries. This embodiment will be discussed in more detail below.

Regarding the alternative or additional method of determining boundaries of a z-stack by integrating a blurriness metric function, the predefined part of the total integral of the blurriness metric function may be chosen in the range of 60 to 80% or 60 to 70% or to be 63% (corresponding to 1/e) or 66% (2/3). The latter two values are preferred but may be replaced by another value depending on the experimental setup.

In practice, depending on the kind of sample and the imaging mode, the blurriness metric function with the focal position as a variable might show an absolute extremum but not be symmetrical in respect of the corresponding focal position of this absolute extremum. Still in such cases, the integration of the blurriness metric function may be applied to determine the z-stack boundaries. On the other hand, it has been shown that usually no z-stack boundaries can be determined in case it is not possible to find a blurriness metric function showing an absolute extremum.

In an embodiment, the blurriness-W metric function is chosen from a group of metric functions based on gradient methods or based on wavelet decomposition methods.

In an embodiment, the blurriness metric function is chosen from a group of metric functions based on autocorrelation methods.

In another embodiment, the optimum focal point for imaging the object is defined as the focal point at which the blurriness metric function has its absolute extremum.

In another embodiment, the step of generating a set of images of the object, each image being captured at a different focal position, comprises generating a first stack of images using a first focal step size over a first range of focal positions, and generating a second stack of images using a second focal step size over a second range of focal positions. In an embodiment, the second step size is smaller than the first step size. In an embodiment, the second range of focal points is smaller than the first range of focal points. This helps increase the speed of image acquisition by concentrating on the area around the focal plane, which can be rapidly found after generating the first stack of images. After that the area around the focal plane is scanned with higher accuracy.

In another embodiment, the boundaries of the object are determined for each set of images of the first and of the second stack of images. Thus, the process can be optimized in two or even more granularity steps as follows.

In a first step of an embodiment, a stack of around 30 slices/images is taken between the limits of the objective, i.e., at a bigger step size, e.g. 20 µm, in a 600 µm range. The z-range finder is applied according to an embodiment of the present invention, and first z-stack limits are obtained. The z-range finder e.g. provides slices 3 and 18 as the two z-stack boundaries, the z-stack being 300 µm wide.

In a second step, a thinner step size is applied (now e.g. 3.6 µm over a range of 300 µm, giving a total of 84 images). The z-range finder is applied for a second time, also providing the z-stack boundaries, e.g. as slices 25 and 60.

In the embodiment, the output is finally both the lower and the upper boundary of a z-stack for the object. Generally, it is noted that the positions can also be given in microscope stage coordinates in the z-direction instead of slice numbers. This can also include an interpolation of the metric values between two slices and finding the optimal equivalent z-value in micrometers.

In an embodiment, after the step of generating a set of images of the object, the blurriness metric function is applied to each of the images of the set of images, and if the blurriness metric function has an absolute extremum and is symmetrical in respect of the corresponding focal position of this absolute extremum, and does particularly not show any secondary extrema, the blurriness-W metric function is applied to each of the images of the set of images, and, on the other hand, if the blurriness metric function has an absolute extremum but is not symmetrical, the integration of the blurriness metric function is applied to determine the z-stack boundaries; if the blurriness-W metric function is applied, it is verified if the blurriness-W metric function has two secondary extrema adjoining a primary extremum, in which case the boundaries of the z-stack are determined in dependence of (or as being) the focal positions assigned to the two secondary extrema, and in case the blurriness-W metric function does not have two such secondary extrema, the integration over the blurriness metric function is applied to determine the z-stack boundaries.

Embodiments of the present invention further relate to an optical instrument for imaging an object. The optical instrument comprises instrument optics for imaging the object, a focus adjusting unit for adjusting the focal position at which the object is imaged, and a processor being operatively connected to the instrument optics and to the focus adjusting unit for generating a set of images of the object, each image being captured at a different focal position, and being configured to implement any one of the embodiments of a method according to the present invention as described above.

In an embodiment, the optical instrument is a microscope, the instrument optics including microscope optics, especially a microscope objective, configured for generating magnified images of the object.

Embodiments of the present invention further relate to a computer program with program code for performing embodiments of a method as described above according to the present invention when the computer program is run on a processor, particularly on a processor of an optical instrument according to embodiments of the present invention.

It should be noted that the above features of the embodiments can—wholly or in part—be combined to achieve other embodiments still falling under the scope of the present inventive concept as defined in the appended claims.

As used herein, the term "and/or" includes any and all combinations of one or more of the associated listed items and may be abbreviated as "/".

Although some aspects have been described in the context of a method, it is clear that these aspects also represent a description of an apparatus or device being configured to operate according to such a method.

Further embodiments and their advantages are described below in connection with the following figures.

In the following, the figures are described comprehensively, with the same reference signs designating the same or at least functionally same elements. Although the detailed description relates to imaging of objects by microscopes, other optical instruments may be envisaged.

FIG. 1 schematically shows a sloping sample carrier 140 for carrying a sample. The also sloping focus plane/level 150 (see "F") is determined by an autofocus method. In this embodiment, the sample has a varying extension in the focal direction, thus, typically, a focus map may be generated by an autofocus method for microscopic imaging. A microscope is used for imaging the sample, the microscope having an objective of objective range limits 160. The sample, of which a z-stack of images is to be taken, is designated 130 (object of interest). Desired z-stack boundaries may be 120 as a lower boundary and 110 as an upper boundary. In practice, the object boundaries of object 130 of interest may either coincide with the z-stack boundaries or be outside of or inside of such a z-stack boundary 110, 120. In the schematic illustration of FIG. 1, object boundaries are within the z-stack boundaries 110, 120.

In the following description, it is discussed how such z-stack boundaries 110, 120 may be determined automatically by embodiments of the present invention.

Figure 2:
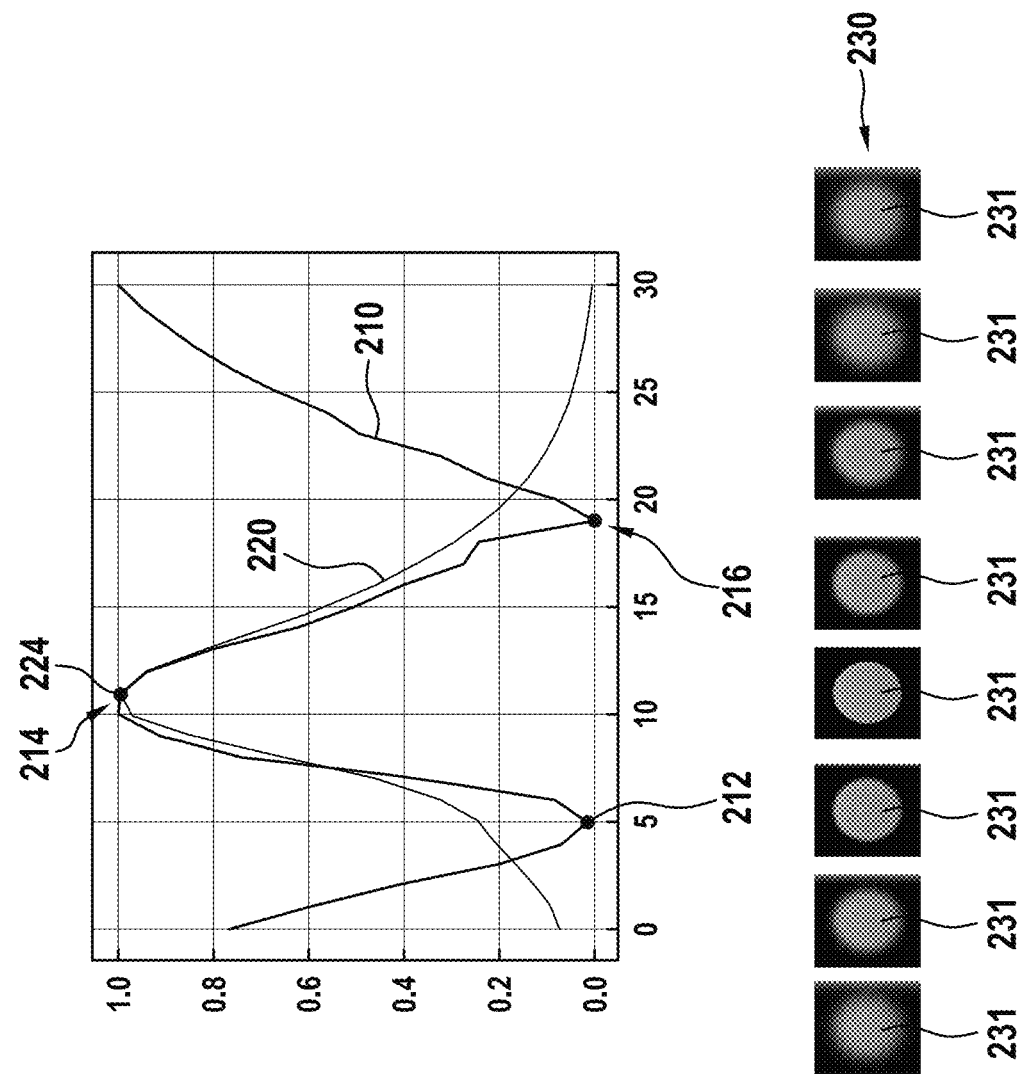
FIG. 2 schematically shows a blurriness-W metric function and a blurriness metric function used for determining z-stack boundaries in a set of images.

FIG. 2 shows in its lower part, in the horizontal direction, exemplary images of an object 130, which represents a typical reference object as discussed above of spheroidal shape and clearly defined boundaries, taken at different focal positions in the z-direction as shown in FIG. 1 through microscope optics configured for generating magnified images of the object. From a visual inspection, it becomes clear that the focal plane where the image has its highest sharpness is at the focal position of about the tenth image (might also be the eleventh or twelfth image). It is noted that only 8 images of the total of 31 images (image 0 to image 30) are shown in FIG. 2. While a user might easily identify the focal position of the optimal focal plane for imaging the object 130 visually by inspecting the images 0 to 30 of FIG. 2, only a thorough inspection of the object boundaries may allow a user to determine z-stack boundaries 110, 120 as shown in FIG. 1. Z-Stack boundaries 110, 120 may, however, be found by applying the following embodiment of a method of the present invention.

After having generated a set 230 of images 231, each image 231 being captured at a different focal position in the z-direction (see FIG. 1), a blurriness-W metric function 210 is applied to each of the images 231 of the set 230 of images. The blurriness-W metric function 210 calculates a metric value (y-axis) for each of the images 231, different metric values being associated to a different image sharpness or blurriness of the corresponding images, as can be seen from the set 230 of images 231 below the graph. The graph of FIG. 2 shows the blurriness-W metric function 210 with the focal position as a variable (x-axis). The blurriness-W metric function 210 clearly shows a primary extremum or maximum 214 and two secondary extrema or minima 212 and 216 adjoining the primary extremum 214, resulting in the typical "W" form. The inventors found that the z-stack boundaries 110, 120 of FIG. 1 can be determined in dependence of the focal positions assigned to the two secondary extrema 212 and 216.

For example, the focal positions assigned to the two minima 212, 216 may directly be used as the z-stack boundaries 120 and 110. It should be noted that, depending on the experimental setup, the shape and the topology of another object 130 may deviate from the example discussed in connection with FIGS. 1 and 2. Also, the microscopic imaging mode influences the images 231 taken in the set 230 of images 231. Thus, the behavior of the blurriness-W metric function 210 may, in practice, be different when applied to different objects 130 and/or under a different microscopic imaging mode. Such different experimental setups may result in the blurriness-W metric function 210 no longer clearly showing secondary extrema and/or a primary extremum. Similar considerations apply to the blurriness metric function 220 shown in FIG. 2. Embodiments of the present invention allow even to deal with such different experimental setups as will be explained in the following.

A suited blurriness metric function 220 is also applied to each of the images 231 of the set 230 of images, also the blurriness metric function 220 calculating a metric value for each of the images 231, different metric values being associated to a different image sharpness or blurriness of the corresponding images 231 as can be seen from FIG. 2. The blurriness metric function 220 with the focal position as a variable (x-axis) shows an absolute extremum 224 at a focal position, which represents the optimal focal point. For autofocusing purposes, the optimal focal point may be easily determined by applying the blurriness (or sharpness) metric function 220 to the set 230 of images 231. However, the blurriness metric function 220 as such does not give any indication as to boundaries of a z-stack of images of the object. Nevertheless, the inventors found an alternative embodiment for determining boundaries 110, 120 of a z-stack by only applying a blurriness metric function 220 as shown in FIG. 2, especially if, for example due to the present experimental setup, no blurriness-W metric function 210 is applicable. Such a case will be discussed in further detail below.

As can be best seen from FIG. 2, the blurriness metric function 220, which is rather a "sharpness metric function" as its global maximum gives the focal position of maximal sharpness, is particularly sensitive to focus, is monotonically decreasing at both sides next to the focus, is quite symmetric about the peak and does not show any local extrema. Thus, blurriness metric function 220 in the embodiment of FIG. 2 is a good representative of a type of metric functions, which may be used as "blurriness metric functions" in the meaning of the present invention.

The blurriness-W metric function 210 shows a global maximum for maximal sharpness at almost the same focal position as the blurriness metric function 220. Additionally, the blurriness-W metric function 210 shows two local minima 212, 216 adjoining the global maximum 214. These local minima 212, 216 are indicative of edges of the object 130 at which the corresponding images 231 are still sufficiently sharp so that the image of the object can be differentiated from its background. The blurriness-W metric function 210 of the embodiment of FIG. 2 is therefore a good candidate of the type of metric functions, which may be used as blurriness-W metric functions.

In an embodiment, the blurriness-W metric function 210 is chosen from a group of metric functions based on gradient methods or based on wavelet decomposition methods. More particularly, among the metric functions based on gradient methods, metric functions making use of the first derivatives of an image in the x-direction and the y-direction, respectively, and thus of the spatial frequencies, have proven beneficial. In an embodiment, the blurriness-W metric function is a function as described in equation A.13 on page 1427 of "Analysis of focus measure operators for shape-from-focus", Said Pertuz et al., in Pattern Recognition 46 (2013) 1415-1432. Metric functions based on wavelet decomposition methods are mostly based on the statistical properties of the discrete wavelet transform (DWT) coefficients. In the first level DWT, the image is decomposed into four sub-images. A metric function based on the first level DWT has proven beneficial for use as a blurriness-W metric function. In such an embodiment, the blurriness-W metric function is a function as described in equation A.40 on page 1430 of "Analysis of focus measure operators for shape-from-focus", Said Pertuz et al., in Pattern Recognition 46 (2013) 1415-1432. Further, in an embodiment, the blurriness metric function is chosen from a group of metric functions based on autocorrelation methods. In such autocorrelation methods, an image autocorrelation is calculated by e.g. autocorrelating pixel values of adjacent columns or rows. In an embodiment, the blurriness metric function is the function described in equation A.14 on page 1428 of "Analysis of focus measure operators for shape-from-focus", Said Pertuz et al., in Pattern Recognition 46 (2013) 1415-1432.

Figure 3:
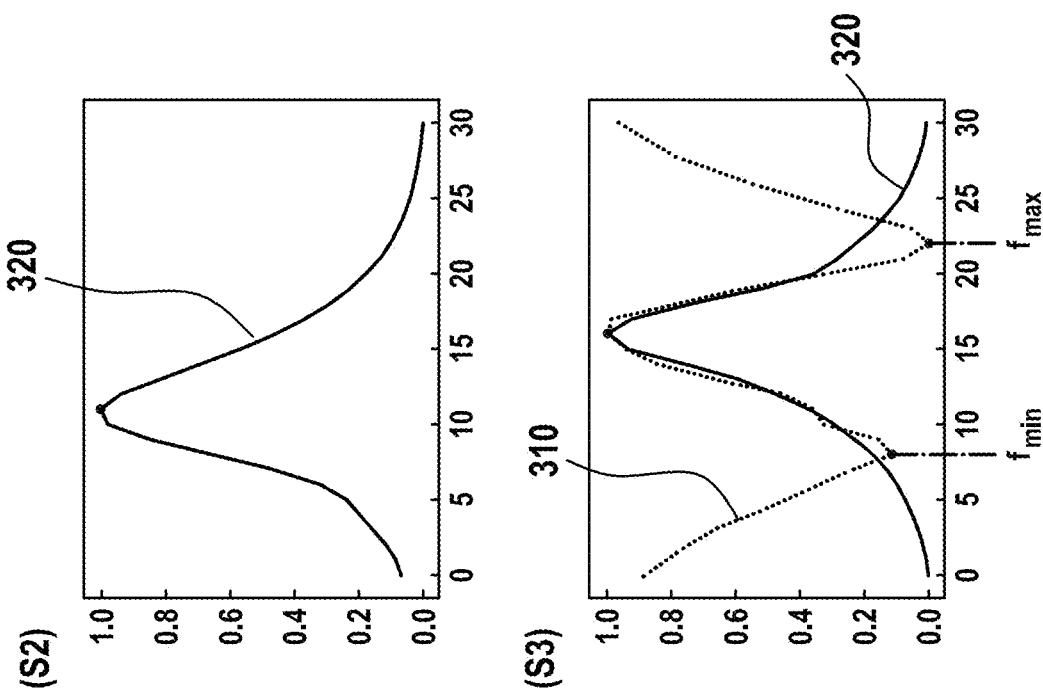
FIG. 3 schematically shows a flow diagram of a workflow (left side of FIG. 3) and corresponding graphs of metric functions (right side)
Figure 3:
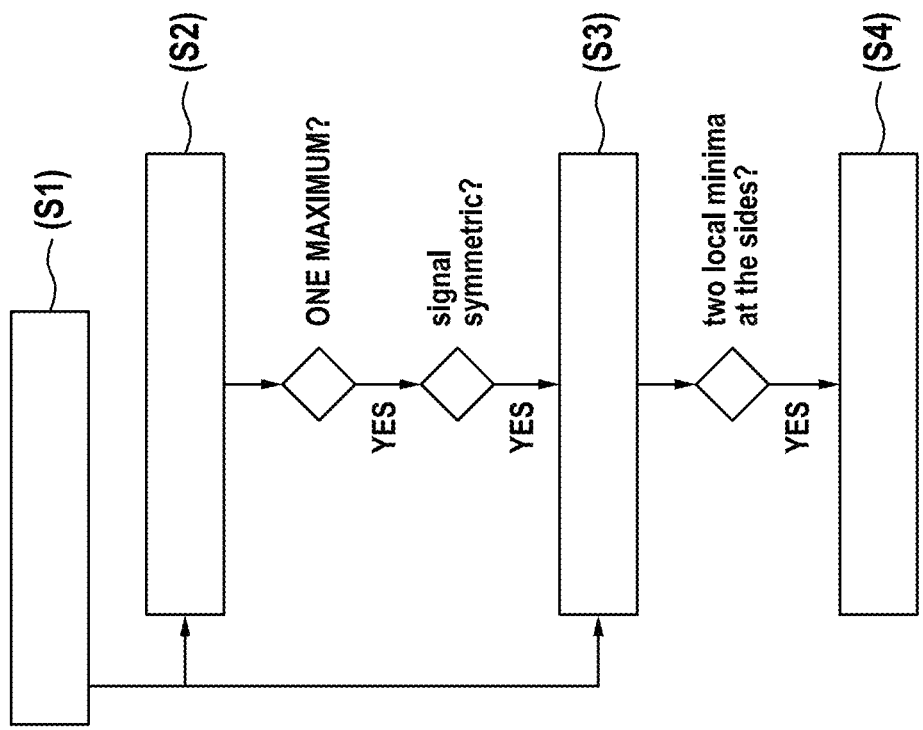

FIG. 3 shows a flowchart according to an embodiment of the method according to the present invention. S1 designates the first step, in which a set 230 of images 231 of the object 130 is generated (see FIGS. 1 and 2), each image being captured at a different focal or z-position. Before step S3 of applying a blurriness-W metric function, in step S2, a blurriness metric function 220 (see FIG. 2) is applied to each of the images 231 of the set 230 of images. Another example of a blurriness metric function used in step S2 in the embodiment of FIG. 3 is depicted on the right side of FIG. 3 with reference sign 320. In a next step it is evaluated whether the blurriness metric function shows an absolute extremum, in this case the absolute extremum is the maximum of function 320. Next, it is evaluated whether the blurriness metric function 320 is symmetrical to a good approximation. Since also this evaluation can be answered positively, the method continues with step S3. Before doing so, it might be expedient to additionally evaluate whether the blurriness metric function 320 does not show any secondary extrema adjoining its absolute extremum, because otherwise the blurriness metric function chosen would rather fall into the category of a blurriness-W metric function.

By applying a blurriness-W metric function 310 in step S3, a corresponding graph as shown on the right side of FIG. 3 at (S3) can be obtained showing the blurriness metric function 320 and the superimposed blurriness-W metric function 310.

Next, the blurriness-W metric function 310 is evaluated as to whether it has two secondary extrema adjoining the primary extremum. As the blurriness-W metric function 310 shows a primary maximum and two local minima adjoining the maximum, the method continues with step S4 of determining the z-stack boundaries in dependence of (here as being identical to) the focal positions assigned to the two minima of metric function 310 shown on the right side of FIG. 3 for step S3. The focal positions of the z-stack boundaries 110, 120 are fmin and fmax, respectively.

The reasons why a blurriness metric function 320 is applied to the set 230 of images before the blurriness-W metric function 310 is applied may be regarded as follows: first, by applying the blurriness metric function 320 the focus position of the focal plane can be found easily as the focal position of the maximum of the blurriness function 320. The set of images evaluated for determining the z-stack boundaries should be acquired in the focal region around the focus position of the maximum of the blurriness metric function 320. Thus, a shifting of the range of focal positions for acquiring the set of images is possible after having first applied the blurriness metric function 320. Further, the inventors found that in an embodiment applying a blurriness-W metric function 310 as shown in FIG. 3, step S3, faster and mostly more reliable results of the z-stack boundaries determination are yielded. Third, having a set of images resulting in a blurriness metric function 320 as shown in step S2 of FIG. 3, in practice, it is most likely that a blurriness-W metric function like function 310 of FIG. 3, which can be regarded belonging to a sub-group of blurriness metric functions, fulfils the requirements as to having a primary extremum and two clear secondary extrema adjoining the primary extremum.

Figure 4:
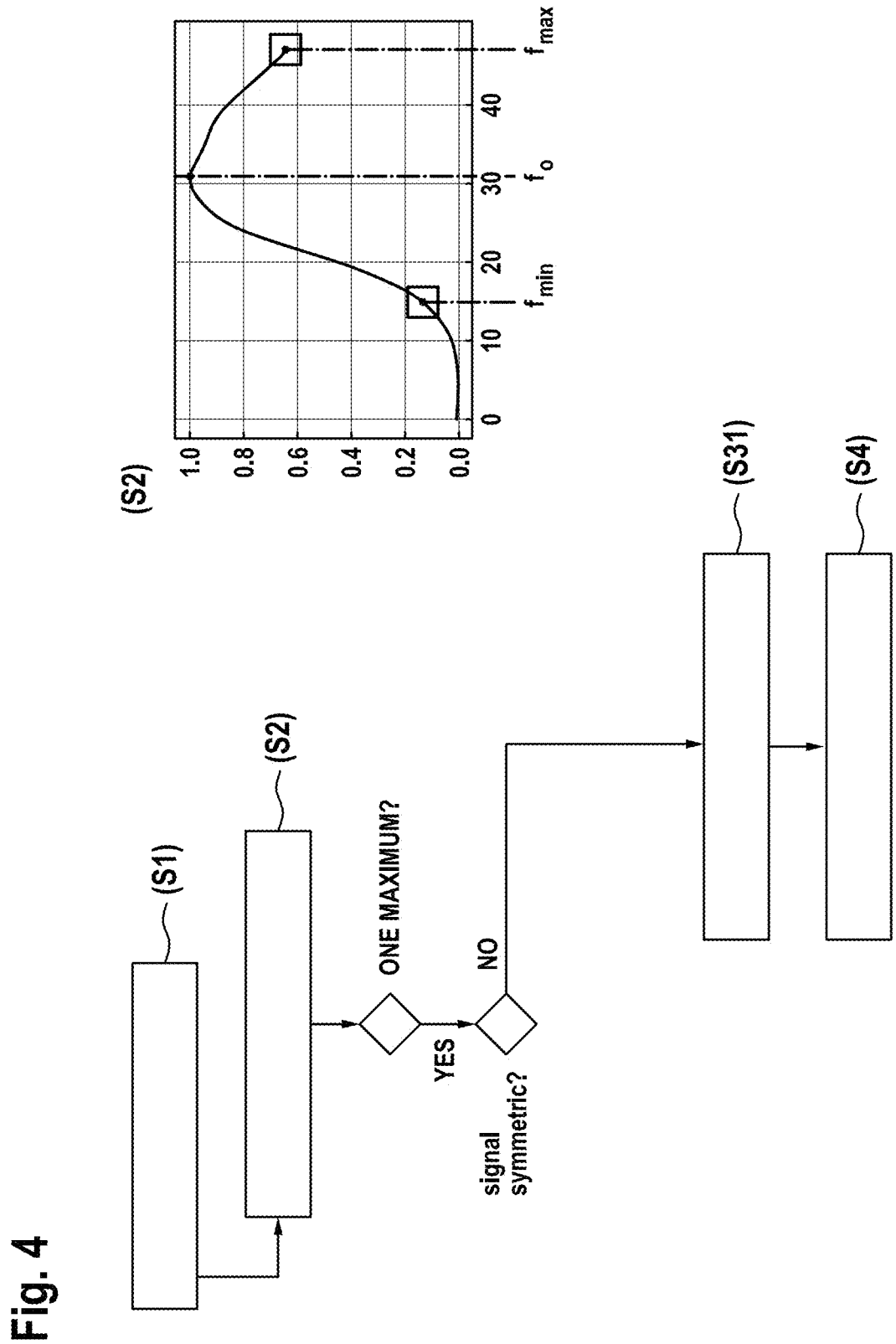
FIG. 4 schematically shows a flow diagram of another workflow of an embodiment of a method according to the present invention.

FIG. 4 schematically shows a flowchart of another embodiment of a method according to the present invention for a case where the evaluation of the blurriness metric function in step S2 results in the blurriness metric function not being symmetric about its peak. Steps S1 and S2 correspond to steps S1 and S2 as discussed with the embodiment of FIG. 3. However, applying a blurriness metric function to the set 230 of images 231 of the object, in this case, yields a graph as shown on the right side of FIG. 4 at (S2) showing the blurriness metric function 420 for this experimental setup. The inventors found that, especially in such cases, it is hardly possible to find a suitable blurriness-W metric function for determining z-stack boundaries. Instead, the existing blurriness metric function 420, which shows an absolute extremum, here maximum, is used for determining the z-stack boundaries. As the symmetry evaluation was answered negatively, the method continues with step S31 by integrating the blurriness metric function 420 starting from the focal position f0 of the absolute extremum/maximum and integrating equally at both sides thereof until a predefined part/percentage of the total integral over all of the focal positions of the set of images is reached. It has been proven beneficial to define the part of the total integral to be 63% or 66% but other values might be taken, preferably from a range of 60% to 80% or 60% to 70% depending on the experimental setup. The z-stack boundaries fmin and fmax are then determined in step S4 in dependence of the focal positions or as being the focal positions assigned to the two limits of the predefined part of the total integral. This integration method will be described in more detail below in connection with FIG. 7.

It should be noted that the integration method as discussed in connection with the embodiment of FIG. 4 may also be applied straight forward after step S2 as an alternative to applying a blurriness-W metric function (see FIG. 3). Another case of applying the integration method will now be discussed in connection with FIG. 5.

Figure 5:
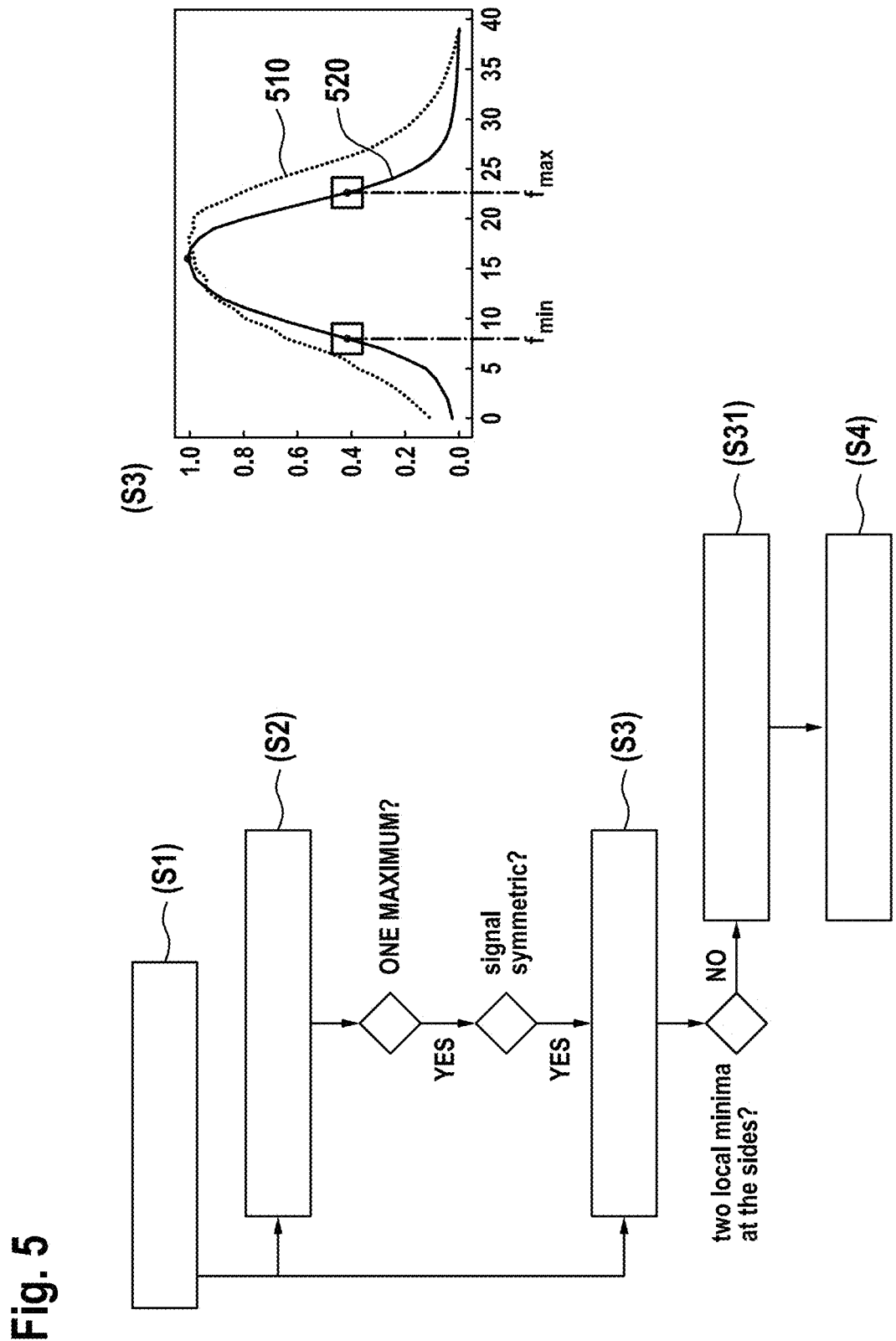
FIG. 5 schematically shows a flow diagram of another embodiment of a method according to the present invention (left side), and a graph of corresponding metric functions (right side)

FIG. 5 shows a flowchart of another embodiment of a method according to the present invention. The flowchart from step S1 to step S3 is identical to that of FIG. 3. Therefore, reference is explicitly made to the discussion of steps S1 to S3 in connection with the embodiment of FIG. 3. Applying a blurriness-metric function to the set 230 of images 231 yields a function 520 as shown in the graph on the right side of FIG. 5 at (S3). Blurriness metric function 520 does have an absolute extremum and is symmetrical about its maximum such that in step S3 a blurriness-W metric function is applied. However, as it is in the case in this experimental setup, the resulting blurriness-W metric function 520 does not show two secondary extrema adjoining the primary extremum/the maximum. One might try to select another suitable blurriness-W metric function but, in practice, it is easier and faster to go to step S31, which is the integration method as described in step S31 in the embodiment of FIG. 4. Thus, reference is made to this embodiment regarding explanation of the integration method of the blurriness metric function 520 as shown in FIG. 5. As a result of the integration method, the z-stack boundaries fmin and fmax are determined in step S4.

Figure 6:
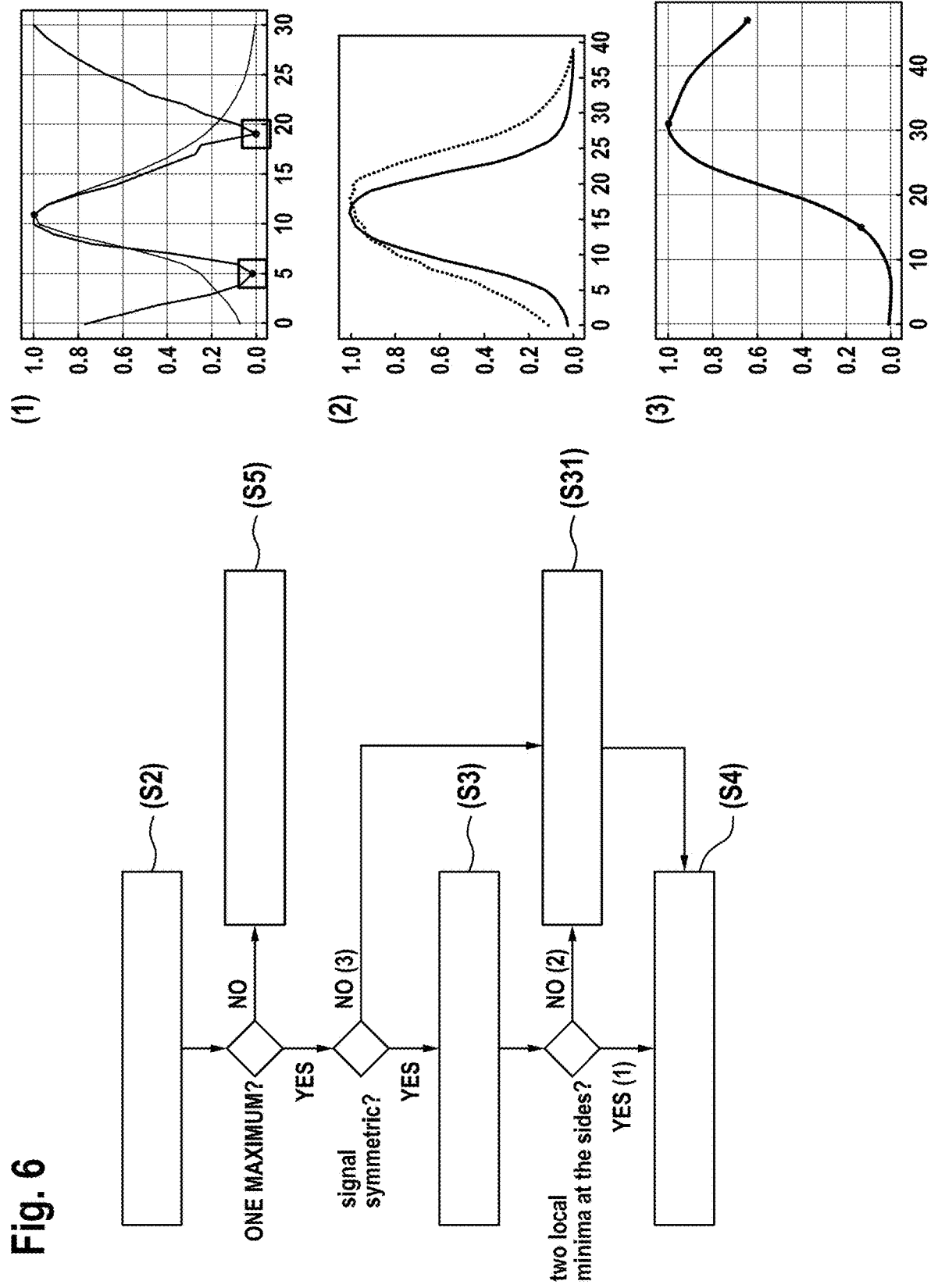
FIG. 6 schematically shows a flow chart of another embodiment of a method according to the present invention (left side), and corresponding graphs of corresponding metric functions (right side)

FIG. 6 schematically shows a flowchart of yet another embodiment of a method according to the present invention. The flowchart of FIG. 6 is a complete workflow of the combined flowcharts of FIGS. 3 to 5. Thus, reference is made to the discussion above for details of the workflow shown in FIG. 6. The following is only a short description of the whole workflow: after the step (not shown in FIG. 6) of generating a set 230 of images 231 of the object 130, first a blurriness metric function 220 is applied to each of the images of the set of images. If the blurriness metric function 220 has an absolute extremum 224 (see FIG. 2) and is symmetrical in respect of the corresponding focal point of this absolute extremum 224 and, particularly, does not show secondary extrema adjoining the absolute extremum, the workflow continues to step S3. If, however, the blurriness metric function fails to show an absolute extremum, the workflow ends in step S5 of not being able to find boundaries of a z-stack. On the other hand, if the blurriness metric function is not symmetrical in respect of the focal point belonging to its absolute extremum, like blurriness metric function 420 shown in FIG. 4, the workflow turns to step S31 and applies the integration method to the blurriness metric function as discussed in detail in connection with the embodiment of FIG. 4.

If the blurriness-W metric function is applied in step S3 without having two secondary extrema adjoining a primary extremum, again, the workflow turns to step S31 as already discussed with the embodiment of FIG. 5. If, however, the blurriness-W metric function 210 applied in step S3 shows two secondary extrema adjoining a primary extremum, the workflow continues to step S4 and determines the z-stack boundaries in dependence of or as being the focal positions assigned to the two secondary extrema.

Figure 7:
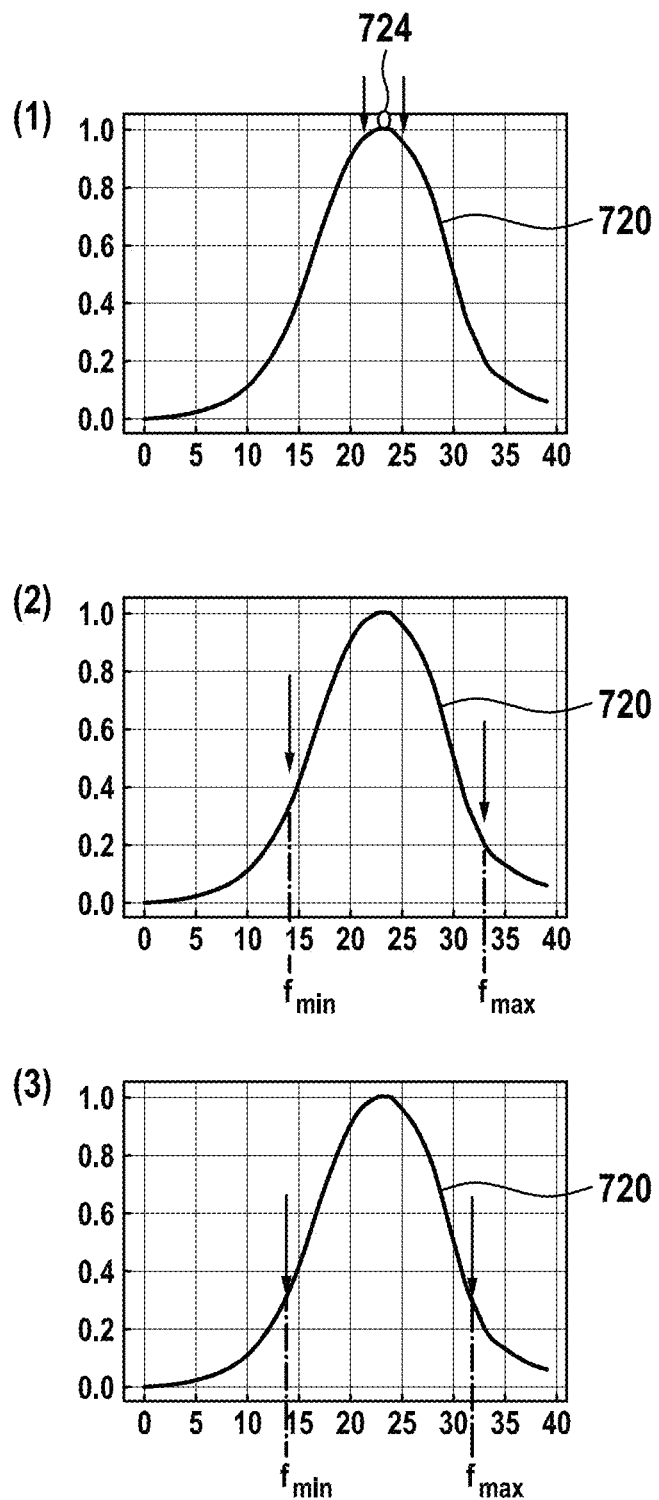
FIG. 7 schematically shows an illustration of a determination of z-stack boundaries by integration of an exemplary blurriness metric function.

FIG. 7 illustrates the integration method applied to a blurriness metric function as described above in connection with the embodiments of FIG. 4 (step S31) and FIG. 5 (also step S31). FIG. 7 illustrates steps of an integration algorithm applied to a blurriness metric function 720 showing a maximum 724 as its absolute extremum. The graph (1) of FIG. 7 shows the blurriness metric function 720 normalized to a range of values 0 to 1 (y-axis) and after smoothing the signal.

First, the total integral of function 720 over the whole range of focal positions of the set of images is calculated. Then, starting from the global maxima 724 an integration is performed by moving stepwise to the left and to the right until the area covered is equal to or for the first time bigger than 66%. Again, 66% is only an exemplary value as discussed above. The corresponding limits of the 66% integral are potential positions of a z-stack (see graph (2) of FIG. 7). The actual z-stack boundaries are determined in dependence of these two potential focal positions as illustrated in graph (3) of FIG. 7.

As a redundancy check, starting from the potential fmin position determined in the previous step as shown in graph (2) of FIG. 7, it is evaluated whether there is a higher focus value before the potential limit fmin; and it is checked whether there is a point of higher focus value after the potential limit fmax. This, obviously, should not be the case for a monotonically decreasing function 720 at both sides of the peak 724. In case, however, such a point of higher focus exists, the corresponding focal position would become the new limit. Then, if the potential limits fmin and fmax as shown in graph (2) of FIG. 7 are not symmetric, at least one of the limits is set to a more restrictive value such that the final limits fmin and fmax as shown in graph (3) of FIG. 7 are symmetric around the peak 724. In the example shown in graphs (2) and (3) of FIG. 7, the potential upper limit fmax was set to a lower, i.e. more restrictive value of the final limit fmax.

Figure 8:
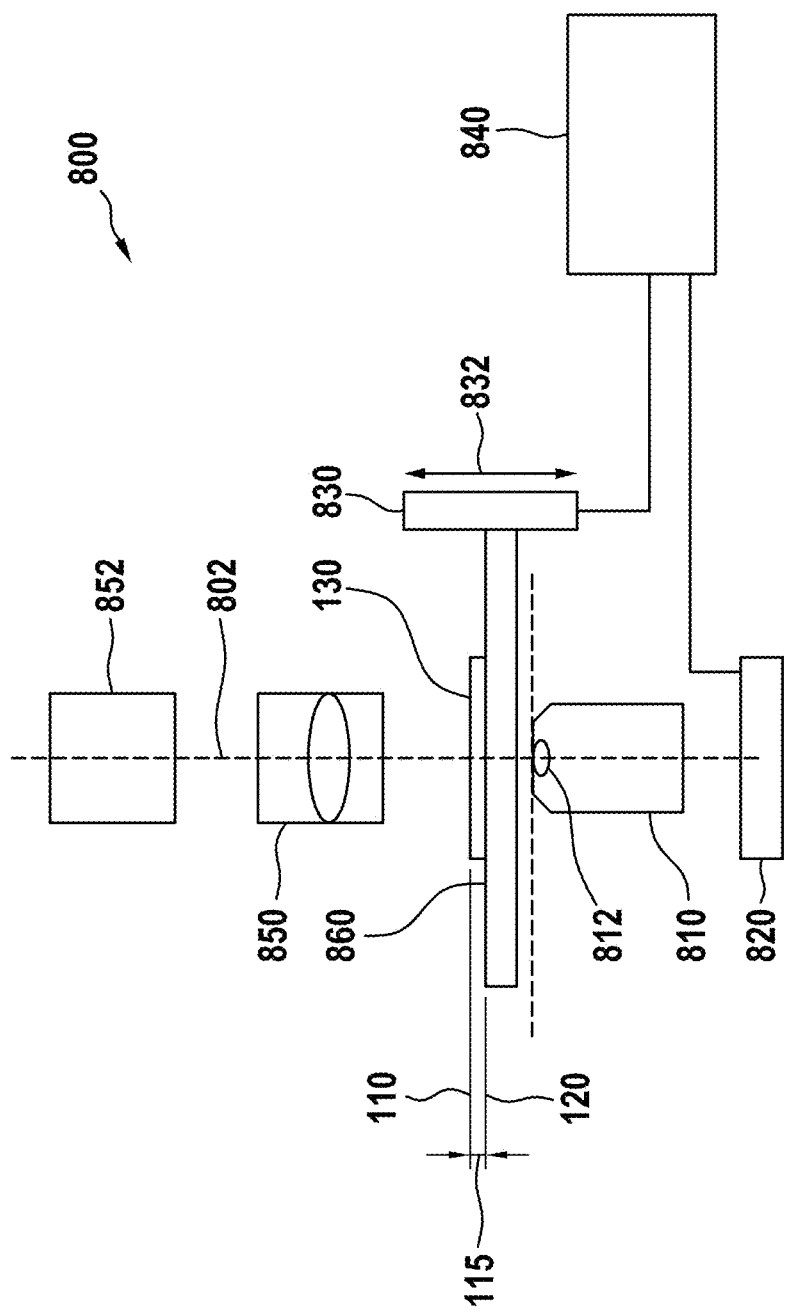
FIG. 8 schematically shows a microscope as an example of an optical instrument according to an embodiment of the present invention.

FIG. 8 schematically shows a microscope 800 as an embodiment of an optical instrument according to the invention. The microscope 800 comprises instrument optics 810, 820 for imaging the object 130, the instrument optics particularly including an objective lens 810 having a front lens 812, and an image detector 820. In this embodiment, the sample or object 130 is placed onto a microscope stage 860 and can be illuminated by a light source 852 and illumination optics 850. The objective lens 810 defines an optical axis 802 for transmitted-light imaging of the sample 130.

The microscope 800 further comprises a processor 840, here in the form of a controller, and a focus adjusting unit 830. The focus adjusting unit 830 of this embodiment comprises a z-drive for moving the microscope stage 860 in the direction of arrow 832. In principle, also the objective lens 810 may be moved in the z-direction. Movement of the z-drive can adjust the focal position at which object 130 is imaged.

The controller/processor 840 is operatively coupled to the instrument optics, here to the image detector 820, and to the focus adjusting unit 830 for generating a set 230 of images 231, each image 231 being captured at a different focal or z-position (see FIG. 2). The controller/processor 840 is further configured to process this set 230 of images 231 according to embodiments of a method according to the invention in order to automatically determine a lower boundary 120 and an upper boundary 110 of a z-stack range 115 as exemplarily shown in FIG. 8.

After having determined the z-stack boundaries 110, 120, a z-stack image acquisition is started to e.g. generate a 3-dimensional representation of the part of the object 130 imaged within the z-stack range 115.

A computer program according to embodiments of the present invention is particularly run on the controller/processor 840, generally on a computer system 840, for performing embodiments of a method according to the invention.

The computer system 840 is configured to execute at least a part of a method described herein. The computer system 840 may be configured to execute a machine learning algorithm. The computer system 840 and microscope 800 may be integrated or separate entities but can also be integrated together in one common housing. The computer system 840 may be part of a central processing system of the microscope 800 and/or the computer system 840 may be part of a subcomponent of the microscope 800, such as a sensor, an actor, a camera or an illumination unit, etc. of the microscope 800.

The computer system 840 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 840 may comprise any circuit or combination of circuits. In one embodiment, the computer system 840 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 840 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 840 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 840 may also include a display device, one or more speakers, and a keyboard and/or controller, which can include a mouse, trackball, touch screen, voice-recognition device, or any other device that permits a system user to input information into and receive information from the computer system 840.

Some or all of the method steps may be executed by (or using) a hardware apparatus, like for example, a processor, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 110, fmin upper boundary of z-stack
115 z-stack range
120, fmax lower boundary of z-stack
130 object of interest, sample
140 sample carrier
150 focal plane
160 objective range limits
210 blurriness-W metric function
212 secondary extremum
214 primary extremum
216 secondary extremum
220 blurriness metric function
224 absolute extremum
230 set of images
231 image
310, 510 blurriness-W metric function
320, 520 blurriness metric function
720 blurriness metric function
724 absolute extremum
800 microscope, optical instrument
802 optical axis
810 objective lens
812 front lens
820 image detector
830 focus adjusting unit
832 direction of movement
840 processor, controller, computer system
850 illumination optics
852 light source
860 microscope stage
S1-S5, S31 method steps

The invention claimed is:

1. A method of automatically determining boundaries of a z-stack of images of an object, which z-stack of the images is to be acquired by imaging the object at a plurality of different focal positions by an optical instrument, the optical instrument comprising instrument optics and a focus adjusting unit for imaging the object at the plurality of different focal positions through the instrument optics, the method comprising the steps of:
    generating a set of images of the object, each image being captured at a different respective focal position;
    applying a blurriness-W metric function to each image of the set of images, wherein the blurriness-W metric function is a blurriness or sharpness metric function that has a focal position as a variable and shows a global extremum for maximal or minimal sharpness at the focal position, and additionally shows secondary extrema adjoining the global extremum;
    calculating, by the blurriness-W metric function, a metric value for each image, different metric values being associated to a different image sharpness or blurriness of the corresponding images; and
    based on the blurriness-W metric function with the focal position as a variable showing a primary extremum and two of the secondary extrema adjoining the primary extremum, determining the z-stack boundaries in dependence of the focal positions assigned to the two secondary extrema.

2. A method of automatically determining boundaries of a z-stack of images of an object, which z-stack of the images is to be acquired by imaging the object at a plurality of different focal positions by an optical instrument, the optical instrument comprising instrument optics and a focus adjusting unit for imaging the object at the plurality of different focal positions through the instrument optics, the method comprising the steps of:

generating a set of images of the object, each image being captured at a different focal position;

applying a blurriness metric function to each image of the set of images, the blurriness metric function calculating a metric value for each image, different metric values being associated to a different image sharpness or blurriness of the corresponding images, wherein the blurriness metric function shows a primary extremum for maximal or minimal sharpness or blurriness at a focal position; and based on the blurriness metric function with the focal position as a variable showing an absolute extremum, an integration of the blurriness metric function is applied starting from the focal position of the absolute extremum and integrating equally at both sides thereof until a predefined part of a total integral over all of the focal positions is reached, the z-stack boundaries being determined in dependence of the focal positions assigned to two limits of the predefined part of the total integral.

3. The method according to claim 1, wherein before the step of applying the blurriness-W metric function to each image of the set of images, a blurriness metric function is applied to each image of the set of images, the blurriness metric function calculating a second metric value for each image, different second metric values being associated to a different image sharpness or blurriness of the corresponding images, and based on the blurriness metric function with a focal position as a variable showing an absolute extremum and being symmetrical in respect of the corresponding focal position of the absolute extremum, applying the blurriness-W metric function to each image of the set of images in order to determine the z-stack boundaries.

4. The method according to claim 3, wherein, based on the blurriness-W metric function showing the primary extremum and the two secondary extrema adjoining the primary extremum, the method comprises the further step of verifying whether the primary extremum of the blurriness-W metric function corresponds to the absolute extremum of the blurriness metric function.

5. The method according to claim 2, wherein the predefined part of the total integral of the blurriness metric function is chosen in the range of 60 to 80%, or 60 to 70%, or 63% or 66%.

6. The method according to claim 2, wherein, based on the blurriness metric function with the focal position as the variable showing the absolute extremum and not being symmetrical in respect of the corresponding focal position of the absolute extremum, applying the integration of the blurriness metric function to determine the z-stack boundaries.

7. The method according to claim 1, wherein the blurriness-W metric function is chosen from a group of metric functions based on gradient methods or based on wavelet decomposition methods.

8. The method according to claim 2, wherein the blurriness metric function is chosen from a group of metric functions based on autocorrelation methods.

9. The method according to claim 2, wherein an optimum focal point for imaging the object is defined as the focal position at which the blurriness metric function has the absolute extremum.

10. The method according to claim 1, wherein the step of generating the set of images of the object for determining the z-stack boundaries, each image being captured at the different respective focal position, comprises generating a first set of images using a first focal step size over a first range of focal positions, and generating a second set of images using a second focal step size over a second range of focal positions.

11. The method according to claim 10, wherein the second step size is smaller than the first step size.

12. The method according to claim 10, wherein the second range of focal positions is smaller than the first range of focal positions.

13. The method according to claim 10, wherein the boundaries of the z-stack are determined for each set of images of the first set of images and of the second set of images.

14. The method according to claim 3, wherein after the step of generating the set of images of the object, first, applying the blurriness metric function to each of the images of the set of images, and if the blurriness metric function has the absolute extremum and is symmetrical in respect of a corresponding focal position of the absolute extremum, applying the blurriness-W metric function to each image of the set of images, and if the blurriness metric function has the absolute extremum but is not symmetrical, the integration of the blurriness metric function is applied to determine the z-stack boundaries, and based on applying the blurriness-W metric function, and based on the blurriness-W metric function having the two secondary extrema adjoining the primary extremum, determining the z-stack boundaries in dependence of corresponding focal positions assigned to the two secondary extrema, and if the blurriness-W metric function lacks two such secondary extrema, applying the integration over the blurriness metric function to determine the z-stack boundaries.

15. An optical instrument for imaging an object, comprising:

instrument optics for imaging the object;

a focus adjusting unit for adjusting a focal position at which the object is imaged; and a processor being operatively connected to the instrument optics and the focus adjusting unit for generating a set of images of the object, each image being captured at a different focal position, and being configured to implement a method according to claim 1.

16. The optical instrument of claim 15, wherein the optical instrument is a microscope, the instrument optics including a microscope objective configured for generating magnified images of the object.

17. A tangible, non-transitory computer-readable medium having instructions thereon which, upon being executed by one or more hardware processors, alone or in combination, provide for execution of the method of claim 1.

18. The tangible, non-transitory computer-readable medium of claim 17, wherein at least one of the one or more hardware processors is a processor of an optical instrument.

* * * * *